Aug. 10, 1926.

N. HEYMAN 1,595,935

ADJUSTMENT MEANS FOR LOUD SPEAKERS

Filed Oct. 20, 1924

Inventor
Nicholas Heyman
by Alfred H. Dyson
Attorney

Patented Aug. 10, 1926.

1,595,935

UNITED STATES PATENT OFFICE.

NICHOLAS HEYMAN, OF BUFFALO, NEW YORK, ASSIGNOR TO FEDERAL TELEPHONE MANUFACTURING CORPORATION, OF BUFFALO, NEW YORK, A CORPORATION OF NEW YORK.

ADJUSTMENT MEANS FOR LOUD SPEAKERS.

Application filed October 20, 1924. Serial No. 744,646.

This invention relates to adjustment means for telephone receivers and particularly for the loud speaker type of receiver commonly used in connection with radio receiving systems.

The adjustment system to which this invention is especially directed provides a control, manually operated by the user, over the amount of the force exerted by the magnet system of the receiver on the vibrating member, such as armature or diaphragm, acted on by the magnet, this control being preferably so arranged as to vary the air gap between magnet poles and vibrating member.

It has been recognized heretofore that such a control left to the discretion and skill of the user, over receivers of the loud speaker type, is desirable in order to obtain best results in volume and quality of sound, and in general to ensure the greatest efficiency possible under the varying conditions of radio reception.

It is found, however, that difficulties arise in connection with the provision of such control means, for example, freezing or blocking of the diaphragm by too close or too wide adjustment, inaccessibility of the adjustment means, misalignment and looseness in the receiver parts, lack of permanency of the adjustment, mechanical weakness and complexity and short life of the adjustment system, too great delicacy of adjustment for satisfactory operation by the user, too great manufacturing cost involved in the precision required to ensure accurate and permanently practical working of the adjustment system.

The object of the present invention is to overcome these and other difficulties which have been met with, and to provide a receiver for loud speaker and like use having a control system of simple and rugged design, easily understood and operated by the user, certain in action, and adapted to accurate and at the same time low cost manufacture.

In accordance with the invention a supporting member in the form of a casing is provided in which are mounted the magnet element, and the diaphragm element or the moving element which actuates a diaphragm. In the preferred form of the invention a diaphragm is secured to the casing in any suitable manner, and a magnet member is secured to a base member rotatable and slidable with respect to the casing. The magnet base comprises a portion or portions so fitted to the casing as to maintain the magnet member and the diaphragm in close alignment at all times. Actuating means in the form of bearing members and bearing faces and comprising for example pins engaging in slots, or other coacting elements, and associated with the casing and with the magnet base, are provided. These actuating means are so formed that a partial rotation of the magnet base with reference to the casing, by means of a control member such as a knob, disk, or cap, changes the length of the air gap between magnet poles and diaphragm. In addition, a resilient means such as a spring is associated with the casing member and the magnet base member to assist in maintaining exact a given setting of the airgap.

Reference is made to the following description and the accompanying drawings for a fuller explanation of constructional features and mode of operation of the invention, and for further objects and advantages thereof which will hereinafter appear.

The same reference character refers to the same part wherever it occurs in the drawings.

Figure 1:
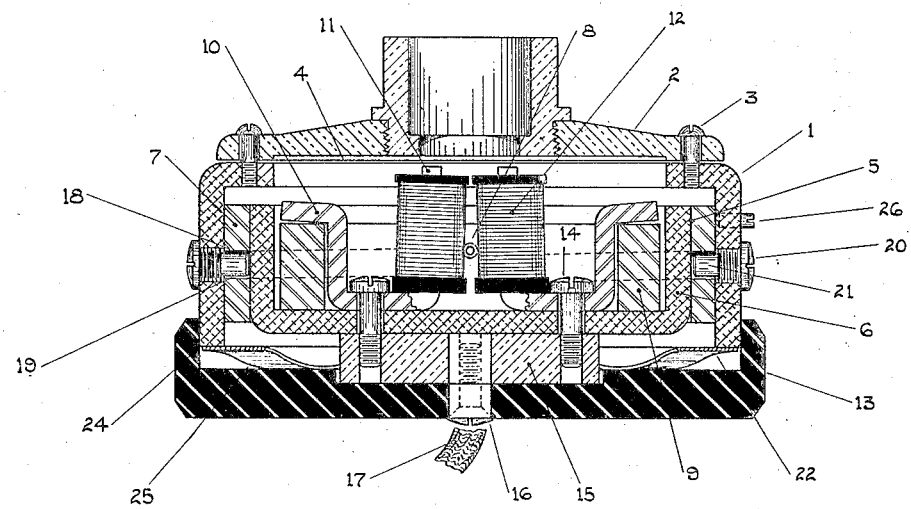
Figure 1 is a sectional view of one embodiment of the invention.

In Fig. 1, which is a vertical section on the center line of a preferred form of the invention, 1 is a cylindrical casing of metal or other suitable material. A cover plate 2 is secured to the casing by screws 3. A diaphragm 4 is mounted in the casing in any suitable manner as by clamping between casing and cover plate and securing by the cover screws 3. A magnet base member 5 is mounted on casing 1 and is a close rotating and sliding fit thereon.

In the present embodiment of the invention, magnet base member 5 is formed of two pieces. One of these pieces is a cup shaped member 6 and the other is a cylindrical member 7. These pieces are firmly fastened together as by rivets, one of which, 8, is shown in Fig. 1. A magnet 9 is mounted within the base member 5 and clamped under pole pieces 10. Extensions of the pole pieces serve as a pair of coil cores 11 for coils 12. Base member 5 is secured to a rotatable control member in the form of a cap 13 which is preferably of insulating material. Fastening means which secure cap 13 and also magnet 9 to base member 5 comprise screws 14 passing through pole pieces 10 and cup shaped member 6, and into a spacer block 15 which may be secured to the cap in any suitable manner as by moulding into the cap. A preferable fastening means of cap to block which permits the removal of the cap without disturbing the magnet assembly comprises screws, one of which, 16, is shown in Fig. 1, which pass through the cap and are screwed into the block. Connecting wires 17 are connected in any suitable manner to the coils and are led out preferably at the center of cap 13.

The actuating means associated with the magnet base and the casing and by which the length of the air gap is controlled comprise, in the present embodiment of the invention, a bearing face formed in the piece 7, and bearing members projecting from the casing and into engagement with the bearing face. A single continuous bearing face may be formed as by forming a single slot extending wholly or partially around the said piece 7. But as shown in the perspective view of Fig. 2, it is preferable for construction reasons to form the bearing face in two or more sections, as 18, which may be the sides of openings, such as slots 19, formed in piece 7. These slots 19, the sides of which in the preferred form of the invention thus form bearing face sections as 18, are cut in approximate spiral form in the surface of the cylindrical piece. The bearing members which engage with the bearing faces are preferably screws as 20 set into the wall of casing 1 and having pin extensions 21 which engage with the walls of slots 19.

Figure 3:
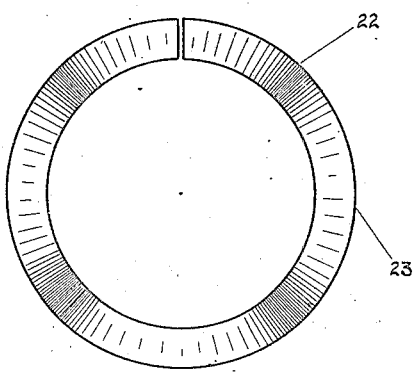
Figure 3 is a plan view of a spring which in the embodiment of Fig. 1 is interposed between the casing wall and a control member which is fastened to the magnet base.

The resilient means preferably provided to aid in the exact adjustment of the air gap may be a spring so placed as to tend to cause relative longitudinal movements of the magnet base and attached parts with respect to the casing, the pressure of the spring tending to force the magnet base either farther away from or farther in toward the casing, depending on the arrangement adopted. In the preferred form of the invention illustrated herein, the spring as 22 may be of flat compression type, as shown in plan in Fig. 3, and with a plurality of corrugations 23. The spring is so placed as to bear against the edge 24 of casing 1 and against the inner face 25 of cap 9, and under compression tends to move the magnet poles, which are rigidly connected to the cap, farther away from the diaphragm, which is secured to the casing.

It will be seen by reference to Fig. 1 that the entire assembly of magnet base 5, magnet and coil structures carried thereon and attached control member, cap 13, is held within the casing by the screws 20 which are fixed to the casing wall and project into the slots formed in the wall of the magnet base. The slots and pins are so shaped that a desired degree of rotation of the slotted piece 7 and parts attached thereto is provided. As the slots are formed spirally in the surface of the ring piece, the pin and slot action results in moving the magnet base farther into or farther out from the casing as the cap is rotated, with a resulting change in the length of the gap between pole pieces and diaphragm. A comparatively minute and gradual change in the length of the air gap is thus accomplished by a comparatively large movement of the easily accessible and easily manipulated control member formed by the large diameter cap piece 13.

It will further be seen that very exact parallelism of magnet poles and diaphragm is maintained under all conditions of adjustment by reason of the extended bearing surface between the casing, which carries the diaphragm, and the wall surface of the magnet base member, which carries the magnet poles.

The spring 22 is preferably arranged to exert considerable pressure between casing and cap so as to hold pins 21 firmly against bearing faces 18 of the slots. The spring, therefore, acts automatically to take up clearances in the working parts and to maintain exact any given setting of the air gap. Further, the spring preferably exerts sufficient pressure between the casing and the assembly of magnet base and cap to hold the cap at any given point in its partial rotation with reference to the casing. Other securing means may, however, be provided, as set screw 26 in the wall of the casing and bearing against the wall of the magnet base.

The amount of adjustment of the air gap provided may vary within wide limits. A sufficient range for ordinary purposes may be .015″ or .016″. In the two pin and two slot arrangement of the adjustment con. means as herein illustrated, the pins and slots are so placed as to provide a rotation of the cap with reference to the casing of 150° or 160°. The initial setting of the instrument is such that with the cap rotated to its limit to narrow the air gap, the pole pieces and diaphragm are still safely out of contact. It will be understood from the drawings that at this setting of the adjustment means, which brings the air gap to a predetermined minimum, the pins 21 will strike the ends of their corresponding slots.

Further rotation of the cap which would result in bringing the pole shoes and diaphragm into contact is thus prevented by this stop means comprised in the adjustment means. The adjustment range of the air gap, therefore, covered by a 150° or 160° rotation of the cap is from a predetermined narrow gap, which may be .008" with poles and diaphragm safely out of contact at any pull of the magnet, to a predetermined maximum gap wider than the minimum by .015" or .016". With this arrangement of the control means the change in length of air gap as the cap is rotated is about .001" for a 10° movement of the cap.

It is to be noted that the construction described, with a spiral of small lead formed in the piece 7, gives the equivalent of a comparatively fine thread screw, and the accurate and delicate adjustment of such a screw, but without the cost and difficulty of construction met with in the production of screws of large diameter and fine thread.

Figure 2:
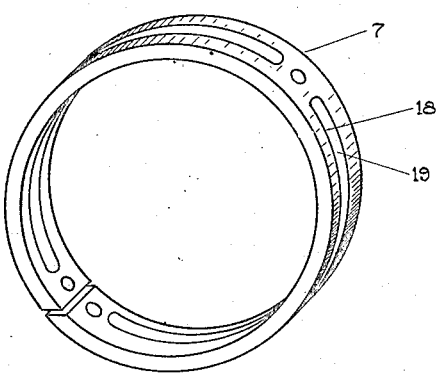
Figure 2 is a perspective view of a cylindrical member having bearing faces formed therein, and which in the embodiment shown in Fig. 1 is secured to the magnet base member.

The cylindrical piece 7 may be a complete ring, or of the split ring form shown in Fig. 2. In this latter type of construction the forming of bearing faces, as by the punching of slots 19, may be done in the flat and the piece afterward bent to proper shape. Instead of the two piece construction of base member 5 it is evident that the piece 7 may be dispensed with entirely and bearing faces formed in wall portions of the member 6 directly. It is preferable, however, to use the two piece construction, as shown, in which, for example, the piece 7 may be cheaply made of steel flat or tube stock, well suited to act as a bearing material, and the member 6 of aluminum or other non-magnetic material. Further, as alternative forms of the invention, the ring piece 7 may be secured rigidly to the casing and the pins or other bearing members may be fixed to the wall portion of member 6, or bearing faces may be formed, as by slotting, directly in the casing wall and the piece 7 dispensed with. As a further alternate form within the scope of the invention, the spring means may be so arranged as to tend to move the magnet base and attached parts farther into the casing, instead of out from the casing, and the coacting bearing faces and bearing members may then be located and formed either essentially as already explained, or may be located elsewhere on the casing member, and on the structure, comprising the magnet base, which moves relatively thereto.

These and other changes in constructional features from the precise form of the invention illustrated and described, may be made without departing from the scope of the invention as set forth in the appended claims.

What is claimed is:

1. In a telephone receiver, a cylindrical casing, a vibrating element mounted on the casing, a magnet member comprising a pole piece in proximity to the vibrating element, a base member for the magnet member comprising a wall portion closely adjacent said casing, and means comprising a bearing face and a bearing member coacting therewith, for varying the gap between pole piece and vibrating element, said bearing face being formed spirally in said wall portion and said bearing member being secured to said casing, said wall portion having a smooth bearing surface which is a close rotating and sliding fit on a smooth bearing surface of said casing and said wall portion providing a comparatively large bearing for said magnet base member on said casing, whereby exact alignment of pole piece and vibrating element is maintained as the gap between them is varied.

2. In a telephone receiver, a cylindrical casing, a vibrating element mounted on the casing, a magnet member comprising a pole piece in proximity to the vibrating element, a base member for the magnet member comprising a wall portion closely adjacent said casing, means comprising a bearing face and a bearing member coacting therewith for varying the gap between pole piece and vibrating element, said means further comprising a control member secured to said magnet base and accessible from outside said casing, said bearing face being formed spirally in said wall portion and said bearing member being secured to said casing, whereby rotation of said control member, and the magnet base secured thereto with respect to the casing varies the gap between pole piece and vibrating element, said wall portion having a smooth bearing surface which is a close rotating and sliding fit on a smooth bearing surface of said casing and said wall portion providing a comparatively large bearing for said magnet base member on said casing, whereby exact alignment of pole piece and vibrating element is maintained as the gap between them is varied.

3. In a telephone receiver, a cylindrical casing member, a diaphragm mounted on the casing member, a magnet member comprising a pole piece in proximity to the diaphragm, a base for the magnet, said base comprising a wall member fitted closely to the casing member, and means associated with the wall member and the casing member comprising a bearing face of spiral form in one of said members and a bearing member secured to the other of said members coacting with said bearing face, whereby rotation of the base member with respect to the casing member varies the gap between pole piece and diaphragm, said wall member having a smooth bearing surface which is a close rotating and sliding fit on a smooth bearing surface of said casing and said wall member providing a comparatively large bearing for said magnet base member on said casing, whereby exact alignment of pole piece and diaphragm is maintained as the gap between them is varied.

4. In a telephone receiver, a cylindrical casing, a diaphragm mounted on the casing, a magnet member comprising a pole piece in proximity to the diaphragm, a base member for the magnet member, the base member having a wall portion fitted closely to the casing, and means comprising a bearing face formed spirally in said wall portion and comprising a bearing member coacting with the bearing face and secured to said casing whereby rotation of the base member with respect to the casing varies the gap between pole piece and diaphragm, said wall portion having a smooth bearing surface which is a close rotating and sliding fit on a smooth bearing surface of said casing and said wall portion providing a comparatively large bearing for said magnet base member on said casing, whereby exact alignment of pole piece and diaphragm is maintained as the gap between them is varied.

5. In a telephone receiver, a cylindrical casing member, a vibrating element mounted on the casing member, a magnet comprising a pole piece in proximity to the vibrating element, a base for the magnet, said base comprising a wall member fitted closely to said casing member and rotatable and axially slidable thereon, means associated with the wall member and the casing member for varying the gap between pole-piece and vibrating element, said means comprising a bearing face of spiral form in one of said members and a bearing member in the other of said members coacting with said bearing face, and resilient means associated with the casing member and with the magnet base member for maintaining said bearing member in contact with said bearing face, said wall member and said casing member having smooth coacting bearing surfaces and said wall member providing a comparatively large bearing surface for said magnet base on said casing member, whereby exact alignment of pole piece and vibrating element is maintained as the gap between pole piece and vibrating element is varied.

6. In a telephone receiver, a casing, a diaphragm mounted on the casing, a magnet member comprising a pole piece in proximity to the diaphragm, a base member for the magnet member, the base member having a wall portion fitted closely to the casing, and means comprising a bearing member secured to the casing and engaging a wall of a slot formed in the wall portion of the base member whereby rotation of the base member with respect to the casing varies the gap between pole piece and diaphragm.

7. In a telephone receiver, a casing, a diaphragm mounted on the casing, a magnet member comprising a pole piece in proximity to the diaphragm, a base member for the magnet member, the base member having a wall portion fitted closely to the casing, means comprising a bearing member secured to the casing and engaging a wall of a slot formed in the wall portion of the base member whereby rotation of the base member with respect to the casing varies the gap between pole piece and diaphragm, and resilient means associated with the casing and with the magnet base whereby said bearing member is maintained in contact with a wall of said slot.

8. In a telephone receiver, a casing, a diaphragm mounted on the casing, a magnet member comprising a pole piece in proximity to the diaphragm, a base member for the magnet member, the base member having a wall portion fitted closely to the casing, means comprising a bearing member secured to the casing, and engaging a wall of a slot formed in the wall portion of the base member whereby rotation of the base member with respect to the casing varies the gap between pole piece and diaphragm, a control member secured to the magnet base member, and a resilient means interposed between the casing and the control member whereby said bearing member is maintained in contact with a wall of said slot.

9. In a telephone receiver, a cylindrical casing member, a vibrating element mounted on the casing, a magnet member comprising a pole-piece in proximity to the vibrating element, a base for the magnet, said base comprising a wall member fitted closely to the casing member, and means associated with the wall member and the casing member comprising a bearing face of spiral form in one of said members and a bearing member secured to the other of said members coacting with said bearing face, whereby rotation of the base member with respect to the casing member varies the gap between pole piece and vibrating element, said wall member having a smooth bearing surface which is a close rotating and sliding fit on a smooth bearing surface of said casing and said wall member providing a comparatively large bearing for said magnet base member on said casing, whereby exact alignment of pole piece and vibrating element is maintained as the gap between them is varied.

In witness whereof, I have hereunto signed my name.

NICHOLAS HEYMAN.